United States Patent [19]
Ballass et al.

[11] 3,935,421
[45] Jan. 27, 1976

[54] FLUX-CORED WELDING WIRE FOR GAS-SHIELDED ELECTRIC ARC WELDING

[75] Inventors: John T. Ballass, Norwich; Richard A. Georgetti, Mystic, both of Conn.

[73] Assignee: Unicore, Inc., North Haven, Conn.

[22] Filed: Oct. 11, 1974

[21] Appl. No.: 514,195

Related U.S. Application Data

[63] Continuation-in-part of Ser. No. 250,240, May 4, 1972, abandoned, which is a continuation-in-part of Ser. No. 53,016, July 7, 1970, abandoned.

[52] U.S. Cl. .................... 219/146; 148/24; 219/74; 219/137
[51] Int. Cl.² .......................................... B23K 35/22
[58] Field of Search .......... 148/24, 26; 219/74, 137, 219/145, 146

[56] References Cited
UNITED STATES PATENTS

| | | |
|---|---|---|
| 2,565,477 | 8/1951 | Crowell et al. ................ 219/146 X |
| 3,023,301 | 2/1962 | Claussen .............................. 219/74 |
| 3,030,496 | 4/1962 | Cotter et al. ....................... 219/145 |
| 3,177,340 | 4/1965 | Danhier ............................. 219/146 |
| 3,405,250 | 10/1968 | Lee ..................................... 219/146 |
| 3,424,892 | 1/1969 | Wilcox ........................... 219/146 X |

*Primary Examiner*—J. V. Truhe
*Assistant Examiner*—N. D. Herkamp

[57] ABSTRACT

A novel flux-cored welding wire for gas-shielded electric arc welding is described characterized by a shiny, metallic-appearing surface on a low carbon steel sheath and containing within its core as essential flux ingredients 6–20% ferro manganese, 6–20% ferro silicon, 1–20% manganous oxide, ½–5% of a flouride compound, and the balance rutile. The wire is especially useful in out-of-position welding to produce sound welds combining good strength and high notch toughness at subzero temperatures.

11 Claims, No Drawings

FLUX-CORED WELDING WIRE FOR GAS-SHIELDED ELECTRIC ARC WELDING

This application is a continuation-in-part of our prior copending application Ser. No. 250,240, filed May 4, 1972 (now abandoned), which in turn is a continuation-in-part of our still earlier patent application, Ser. No. 53,016, filed July 7, 1970 (now abandoned).

This invention relates to flux-cored welding wire for use in gas-shielded, consumable, electric arc welding.

It is known to introduce the flux and alloying ingredients or welding mixture within the core of a hollow steel sheath, and draw down the sheath to a small diameter by pulling same through lubricated drawing dies. To remove drawing compound residues on the completed wire, and to remove any entrained moisture, it is conventional to bake the completed wire. A typical baking cycle is 4 hours at 600° F. The appearance of the wire, which is shiny and metallic prior to baking, changes to a characteristic dull, dark look indicative of the presence of a thin oxide coating on the steel sheath. This oxide coating interferes with establishing a good, solid electrical connection to the wire electrode during the welding process, especially with a continuous electrode for semiautomatic or automatic welding.

Another welding problem frequently encountered is the position of the workpiece requiring out-of-position (vertical or overhead) welding, wherein the weld puddle can not be maintained in a flat or horizontal position. For this application, control of the flux ingredients to provide a stable puddle of low fluidity and which rapidly freezes is essential to prevent puddle drip and other detrimental actions.

Still another welding problem is to obtain a weld of reasonable tensile strength yet possessing good notch toughness (ability to withstand impacts at a stressconcentrating notched section, usually measured by Charpy V Notch Values [CPV] in a standard test at various temperatures) at subzero temperatures. To satisfy this requires careful control of the content of those substances which act as hardening cleansing and refining agents for the steel weldment.

Another problem often encountered in practical welding is the welding of heavily rusted or scaled, and primed (corrosion preventing coated, for example zinc compound or epoxy resin) steel plates. The heavy rust or priming if not removed tends to result in less sound or porous weldments. Removing the rust or priming eliminates the problem, but the cost for doing so is high.

One object of the present invention is a flux-cored welding wire for use in gas-shielded electric arc welding which is characterized by a shiny metallic exterior surface through which good electrical contact can be established and maintained during a semi-automatic or automatic welding process.

Another object of the present invention is a flux-cored welding wire suitable for use in out-of-position gas shielded electric arc welding.

Still another object of the invention is a flux-cored welding wire for use in gas-shielded electric arc welding and capable of producing sound welds in which the weldment exhibits good tensile strength and high notch toughness at sub-zero temperatures.

A further object of the invention is a flux-cored welding wire for use in gas-shielded electric arc welding for producing sound welds on heavily rusted or primed steel plates.

Still a further object of the invention is a flux-cored welding wire for use in gas-shielded arc welding which simultaneously satisfies several of the above-mentioned objects.

These and other objects and advantages as will appear hereinafter are achieved with a flux-cored welding wire characterized by a steel sheath of low carbon content whose exterior surface is shiny and metallic in appearance due to absence of baking following the final drawing operation through lubricated dies, and which contains within its core a novel flux or welding mixture comprising a low content or deoxidizing, steel hardening and refining agents, a small critical amount of a fluoride, and a high content of rutile. More specifically, the novel welding mixture comprises, by weight of the mixture, 6–20% of ferro manganese, 6–20% of ferro silicon, 1–20% of manganous oxide, ½–5% of a fluoride compound, and the balance rutile. Preferably the rutile content, which is the primary slag former, is maintained at 50–70 percent by appropriate adjustment of the proportions of the other ingredients, mainly the ferro manganese and ferro silicon. The fluoride compound is preferably selected from the group comprising solium fluoride, sodium silica fluoride, calcium fluoride, lithium fluoride, potassium aluminum fluoride, and potassium titanium fluoride. The metallic sheath is a plain carbon steel with a carbon content of 0.1 percent or less, and the core mixture constitutes 12–20 percent by weight of the completed wire. Our novel electrode wire are primarily intended for welding mild and low alloy steels.

We do not fully understand the unique coaction that is present between the various substances present in our finished electrode wire, but we believe the following explanation, which is not intended to be limiting, may account for the unusually good performance of our novel flux-cored electrode.

The completed wire electrode that emerges from the final drawing stage still has on its surface drawing compound residues and exhibits a shiny, smooth, metallic appearance. Contrary to the earlier practice, we do not bake the wire to remove the drawing compound residues and any moisture present, because the resultant baked wire will have a thin oxide coating which can interfere with establishing and maintaining proper electrical contact thereto. With our unbaked wire in the as-drawn condition, continuous electrical conductivity from the contact tip to the electrode surface is established even as the wire is continuously fed through the electrode holder providing a smooth continuous flow of current from the contact tip to the wire surface to initiate and maintain continuous welding. However, these drawing compound residues present on the wire can interfere with obtaining a sound weldment. It is our belief that the small amount of fluoride present as well as the manganous oxide in the ranges indicated above prevent any detrimental effects of these drawing compound residues. It is also believed that these two ingredients perform an essential function in the welding of heavily rusted or primed steel plates, the rust and priming when present also having detrimental effects on the weld soundness overcome by the fluoride and manganous oxide constituents. For this latter application, it is preferred that the fluoride content be at the upper end of the specified range, i.e., 3–5 percent.

To achieve good tensile strength and high notch toughness, we use a sheath steel whose carbon content is maintained low, below 0.1 percent. In addition, we also maintain the content of the ferro manganese and ferro silicon relatively low. The ferro manganese and ferro silicon are well known deoxidizers, but also act as alloying, hardening agents for the weldment. Keeping the latter content low, however, increases the possibility of insufficient deoxidizing action, with the result of unsound, porous weldments. We believe that the high rutile content, the manganous oxide, and the fluoride, which may function as a super-deoxidizer, all contribute to keeping oxygen out of the weld puddle or tying it up before it can combine with the carbon present to generate gas. Moreover, it is essential that the welding be carried out under the protection of a conventional shielding gas, such as carbon dioxide, argon, carbon-dioxide-argon mixtures, helium, or argon-oxygen mixtures (oxygen content usually below 3 percent). As a result of the foregoing, we find that welds made with our electrode wire exhibit very high notch toughness, even at subzero temperatures, while retaining satisfactory tensile strength.

For out-of-position welding, where low puddle fluidity and fast-freezing is essential, we prefer compositions wherein the fluoride content is maintained small within the range of ½–1%. For those applications which require out-of-position welding combined with good mechanical properties of the finished weld, we prefer the other ingredients of the welding mixture to be in the proportions of 14–20% ferro manganese, 8–15% ferro silicon, 1–5% manganous oxide, with 50–70% rutile. In this case, we prefer to use as our fluoride, potassium aluminum fluoride. The combined content of the ferro silicon and ferro manganese is preferably maintained at 24–34 percent.

The following examples are illustrative of our invention but not limiting thereof.

To make up the welding mixture, the starting ingredients (rutile, ferro manganese, ferro silicon, manganous oxide, and the fluoride) in the proportions desired (examples given in tables following below) are ground, screened to a mesh size between 50–325 mesh, and thoroughly mixed. The wire sheathing, obtained in strip form is of plain carbon steel. A preferred composition is AISI 1008 (whose maximum carbon content is 0.10 percent) though other low carbon types such as AISI 1010 (max. carbon content 0.13 percent), AISI 1006 (max. carbon content 0.08 percent, and AISI 1005 (max. carbon content 0.06 percent) are suitable. Either rimmed or killed steel can be used, but we prefer rimmed steel as it appears to give better results, and is also less expensive. The strip is initially passed through contour-forming dies to form a generally U-shaped configuration, or trough, into which the finely-powdered welding mixture is introduced in measured amounts to constitute 12–20 percent by weight of the completed electrode. The open end of the U-strip is then closed tight by forming dies and the compacted flux-filled wire drawn through a series of drawing dies to the finished wire diameter, conventional drawing compounds being used to lubricate the wire. We prefer to use during the initial drawing stages where the major size reduction occurs standard dry stearate-type drawing compounds, which is basically fatty acids and their salts containing C, H and O. However, for the final drawing stage to finished wire diameter, we prefer to use a conventional, synthetic, water-base wax drawing compound in a wet (paste) condition. We believe the latter removes some of the stearate residues from the earlier drawing stages. Though any sheath configuration is suitable, we prefer to use a sheath configuration in which the edges rather than just abut are folded inward to contact one another over extended areas of the outer edge surfaces to make for a tighter seam with less risk of drawing compound entrapment (since no baking step is used to remove any entrapped compound or moisture), and to improve the electrical contact and uniformity of current distribution over the wire cross-section. The resultant wire is wound up into a continuous coil or onto spools and sold to the user in the as-drawn condition without subsequent cleaning, polishing or baking steps, thus reducing the manufacturing cost considerably.

Weld tests were performed with 3/32 inches 5/64 inches, and 1/16 inch diameter wires of our invention at 420, 400 and 350 Amperes, respectively, at 29–30 volts with a shielding gas coverage of carbon dioxide at 35–45 cfh. In Table I are reported results on depositing butt welds on ASTM A36 structural steel plates with various surface conditions, such as "as received" plates from the mill, i.e., having both mill scale surfaces and heavily rusted surfaces, and primed surfaces, such as zinc chromate, zinc silicate, and epoxy resin type painted surfaces. The table sets forth various flux compositions in weight percent of the welding mixture of the wire electrode.

TABLE I

| Flux Example No. | 1 | 2 |
|---|---|---|
| Ferro Manganese | 19 | 19 |
| Ferro Silicon | 12.5 | 12.5 |
| Rutile | 53 | 56 |
| Manganous oxide | 12.5 | 12 |
| Fluoride | 3 (as NaF) | 0.5 (as LiF) |
| Tensile Strength, psi | 82,000 | 89,800 |
| Yield Strength, psi | 73,500 | 81,300 |
| Elongation, % | 27.5 | 27 |
| CPV Toughness, Ft-lbs. | | |
| at 0° F | 64 | 50.2 |
| " −20° F | 58 | |

As noted above, with primed or heavily rusted surfaces, we prefer a composition with a higher fluoride content, such as No. 1 above. No. 2 Flux composition is useful for welding lightly scaled plates.

In Table II below are reported results under the same conditions described above for out-of-place welding of mild steel members.

TABLE II

| Flux Example No. | 3 | 4 | 5 |
|---|---|---|---|
| Ferro Manganese | 17 | 20 | 17 |
| Ferro Silicon | 11 | 14 | 11 |
| Rutile | 67.5 | 61.5 | 69.25 |
| Manganous oxide | 4 | 4 | 2 |
| Fluoride (as KAlF) | 0.5 | 0.5 | 0.75 |
| Tensile Strength, psi | 86,000 | 97,000 | 85,700 |
| Yield Strength, psi | 76,000 | 85,500 | 76,800 |
| Elongation, % | 27 | 25 | 28.5 |
| CPV Toughness Ft. lbs. | | | |
| at 0° F | 59 | 28 | 70.8 |
| " −20° F | 41 | 40 | 55.7 |
| " −40° F | 43 | | 52 |

In the examples of Table II, the core content ranged between 14–17 percent by weight of the electrode wire. In all instances it was found that the welds were sound, free of porosity, and exhibited excellent mechanical properties, especially high notch toughness at sub-zero temperatures. Moreover, the out-of-place welding operation was easy to carry out and involved fewer difficulties than when using the known flux compositions, especially in maintaining stability of the puddle and fast freezing thus avoiding puddle drip and loss.

As is clear from the foregoing, for the particular applications described above the essential ingredients of the flux of the electrode of our invention are the ferro manganese, ferro silicon, rutile, manganous oxide and fluoride in the ranges specified. Within the scope of our invention other, primarily inert, ingredients can be added to make up the balance where it is preferred to keep the rutile content lower. An example is the addition of iron powder to the flux. It does not act as a deoxidizer but to provide a higher percentage of iron to the weld to increase deposition rate and efficiency. Similarly, as is well-known, electrolytic manganese can be substituted in part for the ferro manganese, with or without the added iron powder. In addition a small amount of alumina (up to 20%) can be added if desired to control the puddle surface tension. We prefer however not to include magnetite in the flux, as we have found that its presence in significant amounts with the lower fluoride content tends to contribute to more porous welds, and so increases fluidity as to make the electrode unsuitable for out-of-place welding.

Summarizing, our novel electrode wire offers the following advantages:

1. the shiny, metallic-appearing exterior surface of the wire permits good electrical contact to be maintained at all times,
2. the flux mixture is non-hygroscopic, and whatever drawing compound residues that remain prevent corrosion of the exterior surface, affording long shelf life,
3. sound reproducible welds having excellent mechanical properties, such as good strength, high notch toughness at subzero temperatures, and good appearance are easily obtained,
4. sound welds on heavily rusted and primed steel are readily obtained,
5. out-of-position welding is readily accomplished to yield sound welds with good mechanical properties,
6. deposition rates and efficiency are high and the resultant slag is easily removed,
7. from the foregoing advantages it is evident that the welding wire is especially adapted for semi-automatic and automaatic welding.

While our invention has been described in connection with specific embodiments thereof, those skilled in the art will recognize that various modifications are possible within the principles enunciated herein and thus the present invention is not to be limited to the specific embodiments disclosed.

What is claimed is

1. A flux-cored welding wire for use in gas-shielded electric arc welding comprising a drawn steel sheath having a core and a welding mixture contained within the core and constituting 12–20 percent by weight of the wire, said welding mixture consisting essentially of, by weight of said mixture, 6–20% ferro manganese, 6–20% ferro silicon, 1–20% manganous oxide, ½–5% of a fluoride compound selected from the group consisting of sodium fluoride, sodium silica fluoride, calcium fluoride, lithium fluoride, potassium aluminum fluoride and potassium titanium fluoride, and the balance rutile and constituting at least 50 percent of the mixture, the sheath exterior surface being shiny and metallic-appearing with unremoved drawing compound residues.

2. A flux-cored welding wire as claimed in claim 1 in which the welding mixture constitutes 14–17 percent of the wire.

3. A flux-cored welding wire as claimed in claim 1 wherein the combined weight percent of ferro manganese and ferro silicon is 24–34.

4. A flux-cored welding wire as claimed in claim 1 in which the fluoride compound is ½–¾% potassium aluminum fluoride.

5. A flux-cored welding wire as claimed in claim 1 in which the welding mixture consists essentially of 17% ferro manganese, 11% ferro silicon, 67.5% rutile, 4% manganous oxide and 0.5% potassium aluminum fluoride.

6. A method of welding steel members having primed or rusted surfaces by establishing an electric arc between the members and a welding wire as claimed in claim 1 while passing a shielding gas around the arc, the fluoride content of said wire being from 3–5 percent.

7. A flux cored welding wire for use in gas-shielded electric arc welding comprising a drawn steel sheath having a carbon content below about 0.1 percent and a core and a welding mixture contained within the core and constituting 12 – 20% by weight of the wire, said welding mixture consisting essentially of, by weight of said mixture, 6–20% ferro manganese, 6–20% ferro silicon, 50–70% rutile, 1–20% manganous oxide, ½–5% of a fluoride compound selected from the group consisting of sodium fluoride, sodium silica fluoride, calcium fluoride, lithium fluoride, potassium aluminum fluoride and potassium titanium fluoride, and the balance inert ingredients, the sheath exterior surface being shiny and metallic-appearing and contaminated with drawing compound residues.

8. A flux-cored welding wire as claimed in claim 7 wherein the welding mixture consists essentially of 14–20% ferro manganese, 8–15% ferro silicon, 50–70% rutile, 1–5% manganous oxide, and ½–1% of the fluoride compound.

9. A method of out-of-position welding of steel members by establishing an electric arc between the members and a welding wire as claimed in claim 4 while passing a shielding gas around the arc.

10. A method of making between steel members a weld possessing high tensile strength and high notch toughness at sub-zero temperatures, comprising establishing an electric arc between the steel members and a welding wire as claimed in claim 4 in the presence of a shielding gas.

11. A flux-cored welding wire for use in out-of-place continuous electric-arc welding comprising a low carbon steel sheath having a core and a welding mixture contained in the core and constituting 12–20 percent by weight of the wire, said welding mixture consisting essentially, by weight of said mixture, of 6–20% ferro manganese, 6–20% ferro silicon, 50–70% rutile, 1–5% manganous oxide, and ½–1% of a fluoride compound selected from the group consisting of sodium fluoride, sodium silica fluoride, calcium fluoride, lithium fluoride, potassium aluminum fluoride and potassium titanium fluoride.

* * * * *